(12) United States Patent
Medagoda et al.

(10) Patent No.: US 10,209,714 B2
(45) Date of Patent: Feb. 19, 2019

(54) LINE ACQUISITION PATH GENERATION

(71) Applicant: AGJUNCTION LLC, Hiawatha, KS (US)

(72) Inventors: Eran D. B. Medagoda, Morningside (AU); Timothy J. Sullivan, Kedron (AU); Tri M. Dang, Durack (AU)

(73) Assignee: AGJUNCTION LLC, Hiawatha, KS (US)

( * ) Notice: Subject to any disclaimer, the term of this patent is extended or adjusted under 35 U.S.C. 154(b) by 0 days.

(21) Appl. No.: 15/483,061

(22) Filed: Apr. 10, 2017

(65) Prior Publication Data

US 2017/0293303 A1 Oct. 12, 2017

Related U.S. Application Data

(60) Provisional application No. 62/321,393, filed on Apr. 12, 2016.

(51) Int. Cl.
*G05D 1/02* (2006.01)
*A01B 69/08* (2006.01)
(Continued)

(52) U.S. Cl.
CPC ......... *G05D 1/0212* (2013.01); *A01B 69/008* (2013.01); *B62D 6/002* (2013.01);
(Continued)

(58) Field of Classification Search
CPC .... A01B 69/006; A01B 69/008; B62D 6/002; G01C 21/20; G05D 1/0088; G05D 1/021;
(Continued)

(56) References Cited

U.S. PATENT DOCUMENTS 5,194,851 A 3/1993 Kraning et al.
5,375,059 A 12/1994 Krystos
(Continued)

OTHER PUBLICATIONS

International Search Report and Written Opinion of International Application No. PCT/US17/26780, dated Aug. 30, 2017, pp. 1-20.
(Continued)

*Primary Examiner* — Tyler J Lee
(74) *Attorney, Agent, or Firm* — Schwabe Williamson & Wyatt

(57) ABSTRACT

A line acquisition system predicts and displays an acquisition path to reduce the uncertainty surrounding the path taken by a vehicle when acquiring a destination path. The line acquisition system calculates the drivable acquisition path based on the current states of the vehicle, such as position, speed, heading, and curvature. The line acquisition system continually updates and displays the acquisition path as the vehicle is manually steered by the user. When the user engages a steering controller, the last calculated acquisition path is used to automatically steer the vehicle onto the destination path. Displaying the acquisition path allows the user to observe, prior to automatic steering engagement, the path the vehicle would take from its current state to the destination. The user can then decide whether the predicted acquisition path will interfere with terrain or obstacles that the user wishes to avoid.

17 Claims, 15 Drawing Sheets

(51) Int. Cl.
| | |
|---|---|
| *G01C 21/20* | (2006.01) |
| *B62D 6/02* | (2006.01) |
| *A01B 69/04* | (2006.01) |
| *G05D 1/00* | (2006.01) |
| *B62D 6/00* | (2006.01) |

(52) U.S. Cl.
CPC .......... *G01C 21/20* (2013.01); *G05D 1/0088* (2013.01); *G05D 1/0278* (2013.01); *G05D 2201/0201* (2013.01)

(58) Field of Classification Search
CPC ............... G05D 1/0212; G05D 1/0278; G05D 2201/0201
See application file for complete search history.

(56) References Cited

U.S. PATENT DOCUMENTS

| | | |
|---|---|---|
| 5,390,125 A | 2/1995 | Sennott et al. |
| 5,555,503 A | 9/1996 | Krystos |
| 5,663,879 A | 9/1997 | Trovato et al. |
| 5,923,270 A | 7/1999 | Sampo et al. |
| 6,052,647 A | 4/2000 | Parkinson et al. |
| 6,070,673 A | 6/2000 | Wendte |
| 6,212,453 B1 | 4/2001 | Kawagoe et al. |
| 6,373,432 B1 | 4/2002 | Rabinowitz et al. |
| 6,377,889 B1 | 4/2002 | Soest |
| 6,445,983 B1 | 9/2002 | Dickson et al. |
| 6,539,303 B2 | 3/2003 | McClure et al. |
| 6,711,501 B2 | 3/2004 | McClure et al. |
| 6,789,014 B1 | 9/2004 | Rekow et al. |
| 6,819,780 B2 | 11/2004 | Benson et al. |
| 6,865,465 B2 | 3/2005 | McClure |
| 6,876,920 B1 | 4/2005 | Mailer |
| 7,142,956 B2 | 11/2006 | Heiniger et al. |
| 7,162,348 B2 | 1/2007 | McClure et al. |
| 7,257,486 B2 * | 8/2007 | Shimazaki ......... B62D 15/0275 340/932.2 |
| 7,277,792 B2 | 10/2007 | Overschie |
| 7,373,231 B2 | 5/2008 | McClure et al. |
| 7,400,956 B1 | 7/2008 | Feller et al. |
| 7,437,230 B2 | 10/2008 | McClure |
| 7,460,942 B2 | 12/2008 | Mailer |
| 7,689,354 B2 | 3/2010 | Heiniger et al. |
| RE41,358 E | 5/2010 | Heiniger et al. |
| 7,835,832 B2 | 11/2010 | MacDonald et al. |
| 7,885,745 B2 | 2/2011 | McClure et al. |
| 8,018,376 B2 | 9/2011 | McClure et al. |
| 8,190,337 B2 | 5/2012 | McClure |
| 8,214,111 B2 | 7/2012 | Heiniger et al. |
| 8,311,696 B2 | 11/2012 | Reeve |
| 8,386,129 B2 | 2/2013 | Collins et al. |
| 8,401,704 B2 | 3/2013 | Pollock et al. |
| 8,489,291 B2 | 7/2013 | Dearborn et al. |
| 8,521,372 B2 | 8/2013 | Hunt et al. |
| 8,548,649 B2 | 10/2013 | Guyette et al. |
| 8,583,315 B2 | 11/2013 | Whitehead et al. |
| 8,583,326 B2 | 11/2013 | Collins et al. |
| 8,589,013 B2 | 11/2013 | Pieper et al. |
| 8,594,879 B2 | 11/2013 | Roberge et al. |
| 8,634,993 B2 | 1/2014 | McClure et al. |
| 8,639,416 B2 | 1/2014 | Jones et al. |
| 8,649,930 B2 | 2/2014 | Reeve et al. |
| 8,676,620 B2 | 3/2014 | Hunt et al. |
| 8,718,874 B2 | 5/2014 | McClure et al. |
| 8,768,558 B2 | 7/2014 | Reeve et al. |
| 8,781,685 B2 | 7/2014 | McClure |
| 8,803,735 B2 | 8/2014 | McClure |
| 8,897,973 B2 | 11/2014 | Hunt et al. |
| 8,924,152 B2 | 12/2014 | Hunt et al. |
| 9,002,565 B2 | 4/2015 | Jones et al. |
| 9,002,566 B2 | 4/2015 | McClure et al. |
| 9,141,111 B2 | 9/2015 | Webber et al. |
| 9,162,703 B2 | 10/2015 | Miller et al. |
| 9,173,337 B2 | 11/2015 | Guyette et al. |
| 9,223,314 B2 | 12/2015 | McClure et al. |
| 9,255,992 B2 | 2/2016 | McClure |
| 9,389,615 B2 | 7/2016 | Webber et al. |
| 2002/0072850 A1 | 6/2002 | McClure et al. |
| 2003/0101036 A1 | 5/2003 | Nagel |
| 2004/0186644 A1 | 9/2004 | McClure |
| 2004/0257244 A1 * | 12/2004 | Kubota .............. B62D 15/0285 340/932.2 |
| 2006/0167600 A1 | 7/2006 | Nelson, Jr. et al. |
| 2007/0282499 A1 * | 12/2007 | Maeda ..................... B60T 7/22 701/41 |
| 2009/0326763 A1 | 12/2009 | Rekow |
| 2010/0084147 A1 | 4/2010 | Aral |
| 2010/0235053 A1 * | 9/2010 | Iwakiri ................ B62D 15/027 701/42 |
| 2010/0274452 A1 | 10/2010 | Ringwald et al. |
| 2014/0266877 A1 | 9/2014 | McClure |
| 2014/0277676 A1 | 9/2014 | Gattis |
| 2015/0175194 A1 | 6/2015 | Gattis |
| 2015/0342110 A1 | 12/2015 | Peake |
| 2016/0039454 A1 | 2/2016 | Mortimer |
| 2016/0154108 A1 | 6/2016 | McClure et al. |
| 2016/0205864 A1 | 7/2016 | Gattis et al. |
| 2016/0214643 A1 | 7/2016 | Joughin et al. |
| 2016/0252909 A1 | 9/2016 | Webber et al. |
| 2016/0313737 A1 | 10/2016 | Berkemeir |
| 2016/0334804 A1 | 11/2016 | Webber et al. |
| 2017/0015355 A1 * | 1/2017 | Marczok ................ B60Q 9/005 |
| 2018/0011489 A1 * | 1/2018 | Oba ...................... G05D 1/0088 |
| 2018/0208199 A1 * | 7/2018 | Fujita ....................... G08G 1/00 |

OTHER PUBLICATIONS

Noh, Kwang-Mo, Self-tuning controller for farm tractor guidance, Iowa State University Retrospective Theses and Dissertations, Paper 9874, (1990).

Van Zuydam, R.P., Centimeter-Precision Guidance of Agricultural Implements in the Open Field by Means of Real Tim Kinematic DGPS, ASA-CSSA-SSSA, pp. 1023-1034 (1999).

International Preliminary Report on Patentability; PCT/US17/26780, dated Oct. 25, 2018, pp. 1-12.

* cited by examiner

ENGAGED ACQUISITION PATH

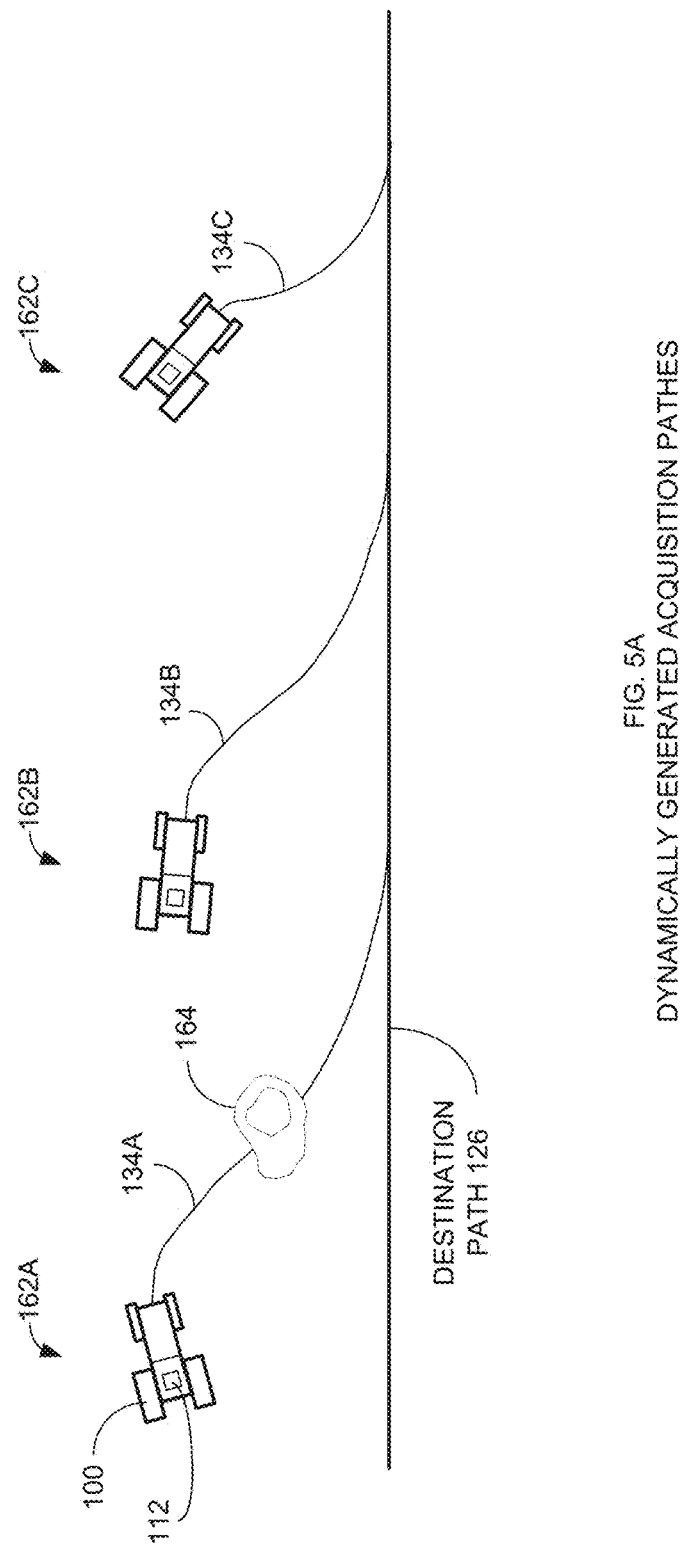

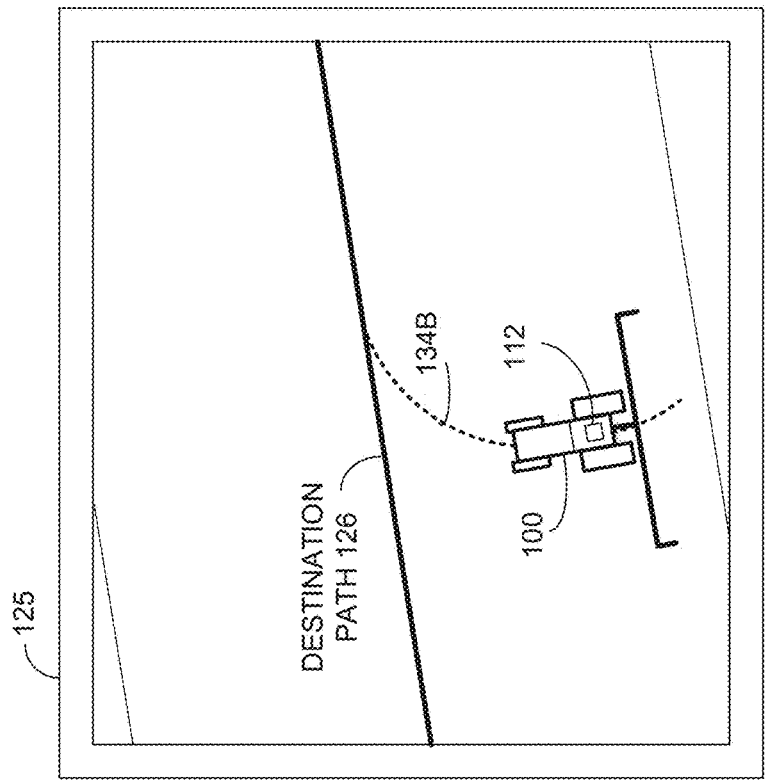
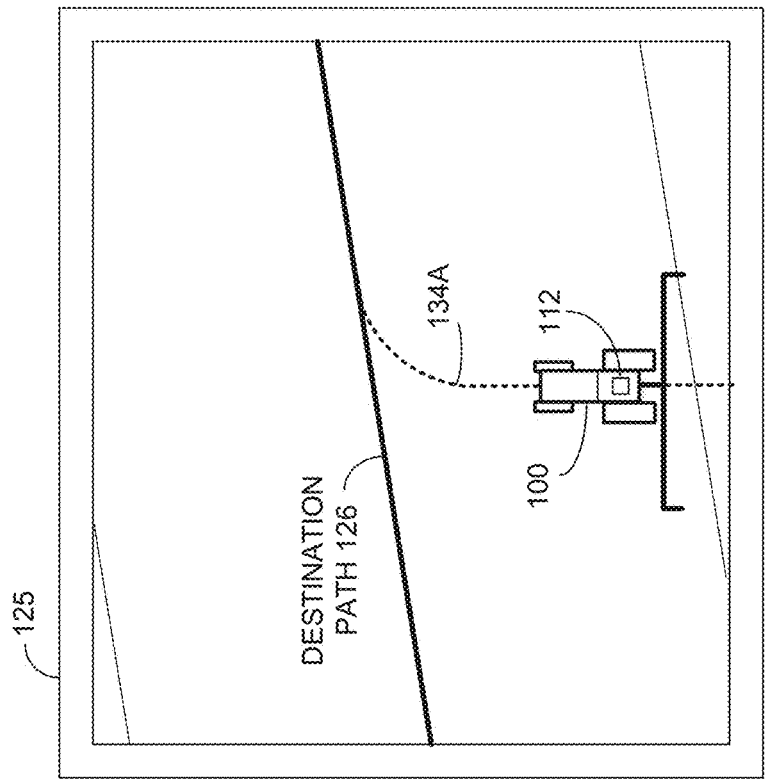

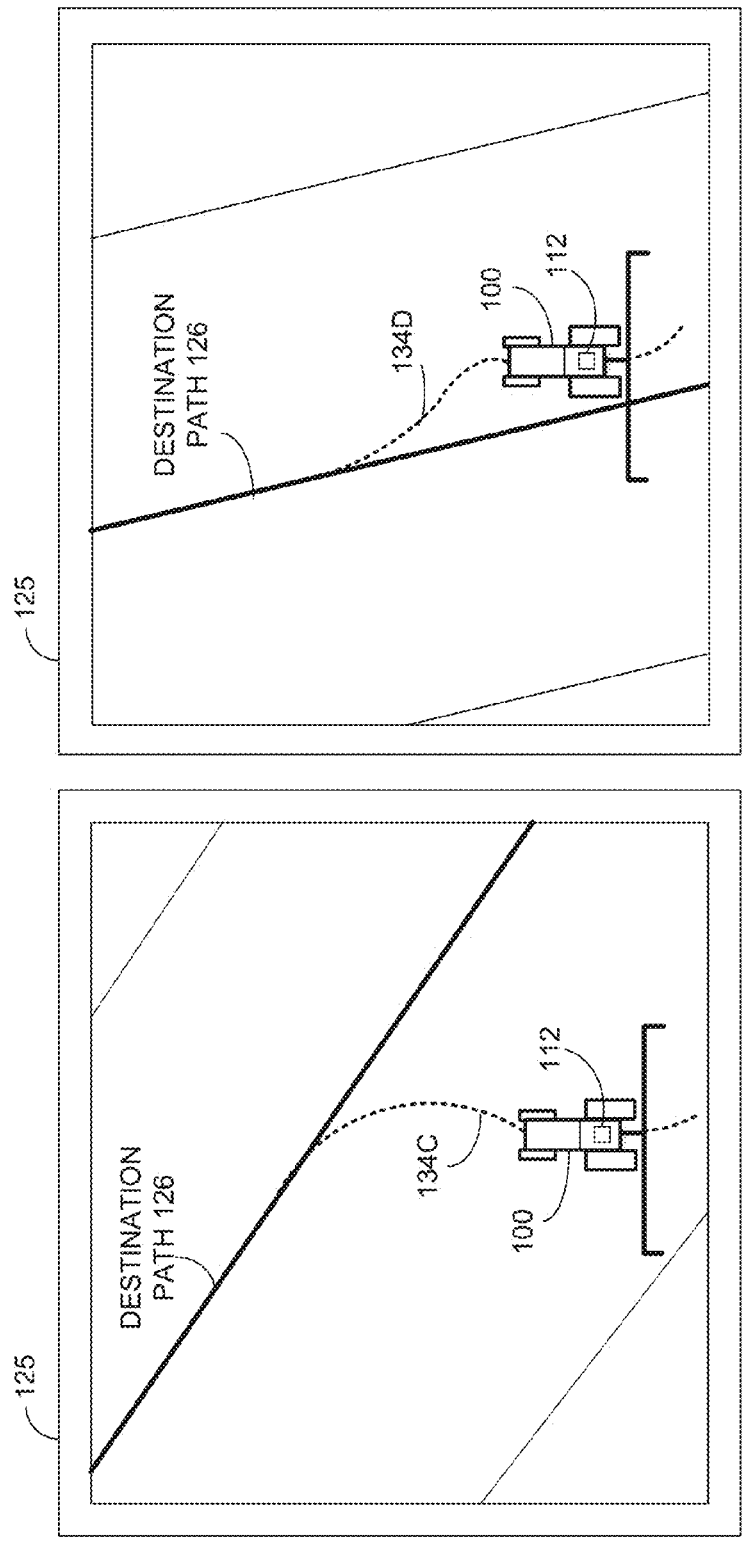

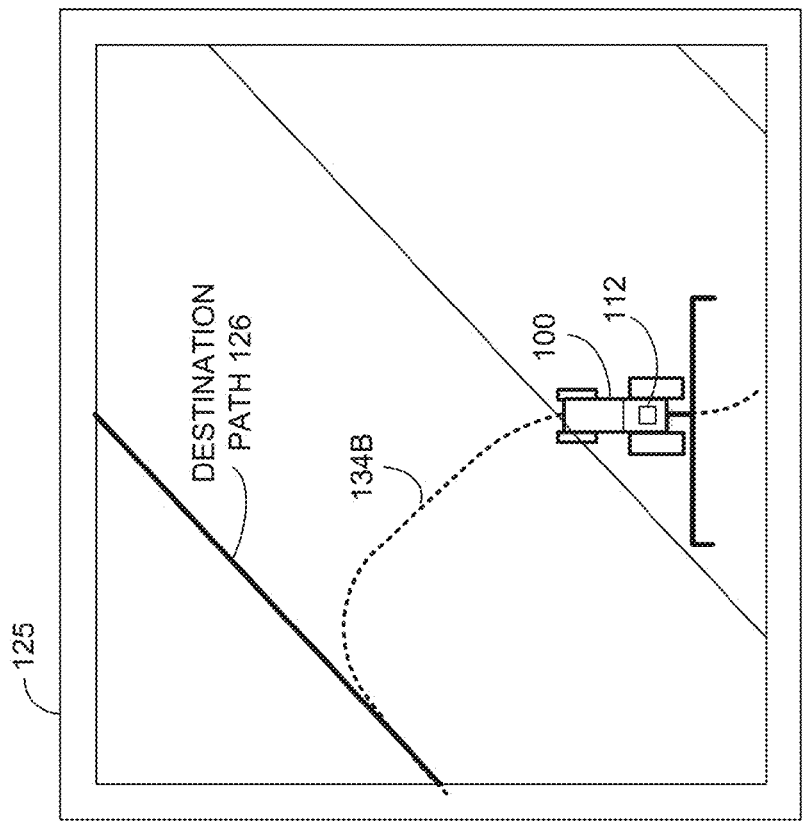
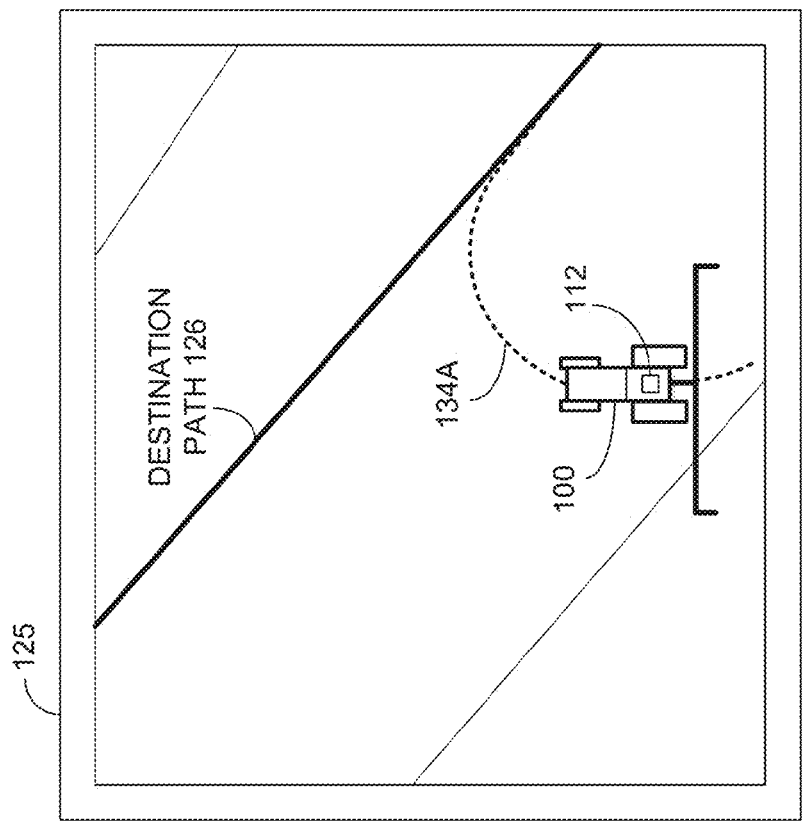

LINE ACQUISITION PATH GENERATION

The present application claims priority to U.S. Provisional Patent Application Ser. No. 62/321,393 filed on Apr. 12, 2016, entitled: LINE ACQUISITION PATH GENERATION which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to a line acquisition system.

BACKGROUND

A steering controller automatically steers a vehicle from a current location to a destination location, such as a destination path on a field. The path taken by the vehicle to the destination is determined on the fly based on the nature of the vehicle's automatic steering control system and the position of the vehicle relative to the destination path. The steering controller continuously adjusts the direction of the vehicle as the vehicle moves closer to the destination path. In other words, the steering controller does not know the acquisition path taken by the vehicle until reaching and acquiring the destination path.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 5A shows dynamically generated acquisition paths.

FIGS. 6A-6D show example acquisition paths for acquiring a straight line destination path.

FIGS. 7A and 7B show examples of right and left turn acquisition paths onto a straight destination path.

DETAILED DESCRIPTION

Figure 1:
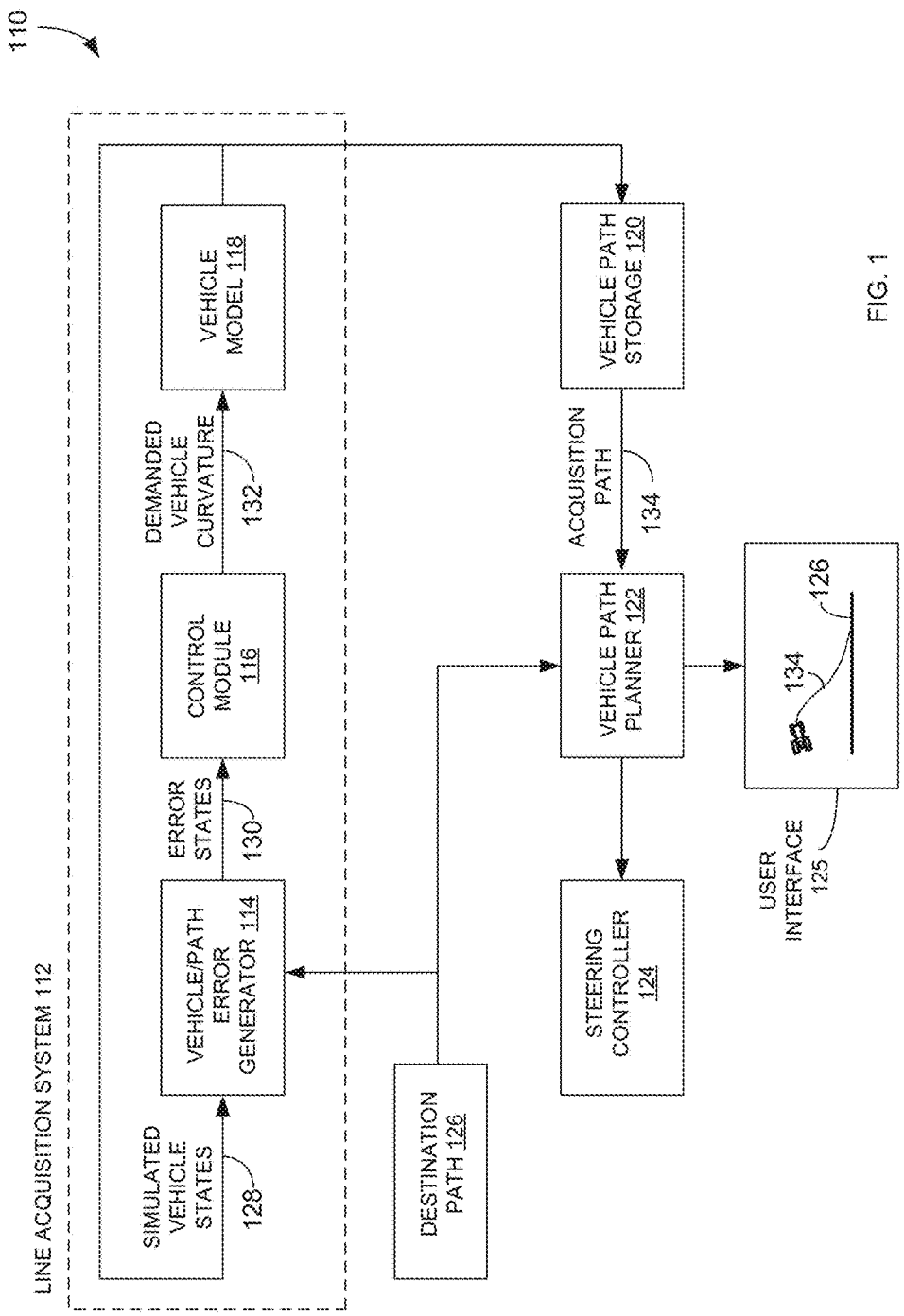
FIG. 1 shows an example line acquisition system.

A line acquisition system predicts and displays an acquisition path to reduce the uncertainty surrounding the path taken by a vehicle when acquiring a destination path. The line acquisition system calculates the drivable acquisition path based on the current states of the vehicle, such as position, speed, heading, and curvature. The line acquisition system continually updates and displays the acquisition path as the vehicle is manually steered by the user. When the user engages a steering controller, the last calculated acquisition path is used to automatically steer the vehicle onto the destination path.

Displaying the acquisition path allows the user to observe, prior to automatic steering engagement, the path the vehicle would take from its current state to the destination. From an agricultural perspective, the acquisition path provides the user with a description of where the vehicle will drive when acquiring a destination path, such as a way-line in a field. The user can then decide whether the predicted acquisition path will interfere with terrain or obstacles that the user wishes to avoid.

Knowledge of the acquisition path has wider implications, ranging from better management of field operations between paths and headlands, the ability to plan vehicle tasks based on the vehicle's current position on the acquisition path, as well as the creation of a robust automatic steering controller that no longer has to contend with uncertain acquisition conditions.

The acquisition path provides the user with a complete drivable path from the vehicle's current position to the destination path. This increases user situational awareness for improved decision making. The user can decide the best time to engage the automatic steering controller, with knowledge that the acquisition path driven by the vehicle will avoid hazards and other areas of the field.

The line acquisition system may increase levels of vehicle autonomy. For example, with a complete computed acquisition path, the user may have fewer steering tasks to perform when processing a field, such as manually steering the vehicle to a suitable position near the destination path before engaging the automatic steering controller. The line acquisition system also may enable automatic end-of-row turns that reduce the amount of manual steering when transitioning between different destination paths and ultimately reducing user workload.

Providing a complete line acquisition path from the vehicle's current position to the destination path may improve automatic steering controller designs. For example, the vehicle may no longer need to perform certain acquisition maneuvers onto the destination path and the steering controller may no longer need to process large controller inputs, such as large cross-track and heading errors. The steering controller can therefore maintain tighter tracking control when positioned on the destination path, since the vehicle may be in-line with the acquisition and destination paths from the moment of automatic steering control engagement.

Predicting acquisition paths also may allow the steering controller to accommodate a greater number of engagement conditions that may otherwise be rejected. These cases occur when the current state of the vehicle relative to the destination path exceeds controller steering constraint limits.

FIG. 1 shows a vehicle control system 110 that uses a model-based vehicle simulator to generate acquisition paths. Vehicle control system 110 may automatically steer a vehicle. For example, vehicle control system 110 may be located on a tractor and used for automatically steering the tractor over way-lines aligned with rows in a field. Vehicle control system 110 may automatically steer the vehicle over the way-lines while the vehicle works, such as plowing, seeding, spraying, unloading, or the like, or any combination thereof. Of course, this is just an example and vehicle control system 110 may steer any type of vehicle over any type of destination path.

Vehicle control system 110 may include a line acquisition system 112 that replicates the closed-loop behavior of a vehicle and predicts the trajectory of the vehicle from a current state onto the destination path. The predicted trajectory generated by line acquisition system 112 is used by a vehicle path planner 122 to generate a drivable path for steering the vehicle from a current position to the destination path.

The line acquisition system 112 may include a vehicle/path error generator 114 that receives a destination path 126 selected by the user and current states 128 of the vehicle. Destination path 126 may be electronically created and stored in memory. As explained above, destination paths 126 may include way-lines for a field selected by the vehicle operator. For example, control system 110 may track global positioning system (GPS) positions of the vehicle traveling along a row in the field and then store the GPS positions as destination path 126.

Current vehicle states 128 may include x and y positions, speed V, heading $\psi$ and curvature K. Error generator 114 may generate error states 130, such as cross-track $e_{ct}$ and heading error $e_\psi$ of the vehicle relative to destination path 126.

Figure 2:
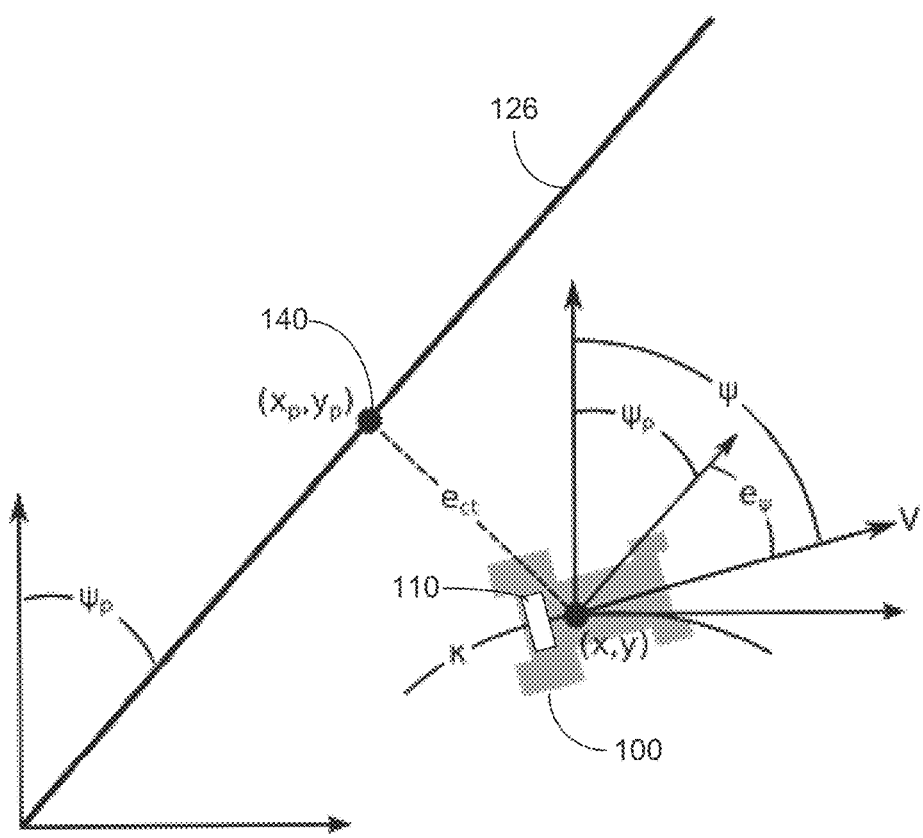
FIG. 2 shows example parameters used for calculating an acquisition path.

FIG. 2 shows an example of the parameters used by vehicle/path error generator 114 in FIG. 1. Referring to FIGS. 1 and 2, error generator 114 calculates error states 130, such as a cross-track error $e_{ct}$ and a heading error $e_\psi$. Error states 130 are based on a comparison of vehicle states 128 (x, y, $\psi$, V, K) with a heading $(x_p, y_p, \psi_p)$ for a nearest point 140 on destination path 126.

A control module 116 uses error states 130 to calculate a demanded vehicle curvature 132 to input into vehicle model 118. Control module 116 contains a model of the steering controller located in vehicle 100. The steering controller model is expressed generally as:

$$\kappa_d = K_1 e_\psi + K_2 e_{ct} + K_3 \int e_{ct} dt. \quad (1)$$

$K_1$, $K_2$ and $K_3$ are controller gains acting on the heading error $e_\psi$, cross-track error $e_{ct}$ and cross-track error integral states, respectively. The output $\kappa_d$ from equation 1 is demanded vehicle curvature 132. Vehicle curvature 132 is limited by the curvature and curvature rate limits of the vehicle prior to its application to vehicle model 118. The curvature and curvature rate limits are applied to curvature demand 132, which is the output of equation 1.

A vehicle model 118 is an idealized representation of vehicle 100. Vehicle model 118 may be expressed in the following form:

$$\dot{x} = V \cos(\psi) \quad (2)$$

$$\dot{y} = V \sin(\psi) \quad (3)$$

$$\dot{\psi} = V \kappa_d \quad (4)$$

In vehicle model 118, the terms x and y again represent positional coordinates of vehicle 100, $\psi$ represents the heading of vehicle 100, and V represents the speed of vehicle 100.

The demanded vehicle curvature $\kappa_d$ generated by control module 116 tries to steer vehicle model 118 onto destination path 126. Vehicle model 118 generates updated vehicle states 128 based on the curvature and curvature rate limited demanded vehicle curvature 132. In other words, vehicle model 118 predicts a change in the position and heading of vehicle 100 based on a current predicted position and heading of vehicle 100 relative to destination path 126.

For example, vehicle 100 may have curvature limits that restrict how far vehicle 100 can turn to the left or right and a curvature rate that limits how quickly vehicle 100 can turn to the left or right. The vehicle operator may execute a series of turns to calculate the vehicle turning curvature limits which would be applied to vehicle curvature 132. Vehicle model 118 would take the limited vehicle curvature 132 when predicting simulated vehicle states 128 for vehicle 100.

Updated vehicle states 128 are fed back into the vehicle/path error generator 114. Error generator 114 then generates error states 130 for the next predicted vehicle position. Line acquisition system 112 recursively executes the above described feedback process until exit conditions are met, by either meeting an acquisition convergence threshold or by exceeding an iteration limit. Acquisition convergence may occur when error states 130 between simulated vehicle states 128 and destination path 126 are within predefined threshold values, such a cross-track error of less than or equal to 2 centimeters and a heading error of less than or equal to 5 degrees. Alternatively, if the iteration limit is exceeded, a drivable solution has not been found.

During the iterative acquisition path process, line acquisition system 112 tracks and stores simulated vehicle states 128 in storage 120. Once line acquisition system 112 converges on a valid solution, the stored simulated vehicle states 128 are fed into a vehicle path planner 122 as acquisition path 134. Vehicle path planner 122 may include a user interface 125 that displays acquisition path 134 and destination path 126. For example, vehicle path planner 122 may display a series of points that show the predicted acquisition path from a current location of vehicle 100 to destination path 126.

Figure 3:
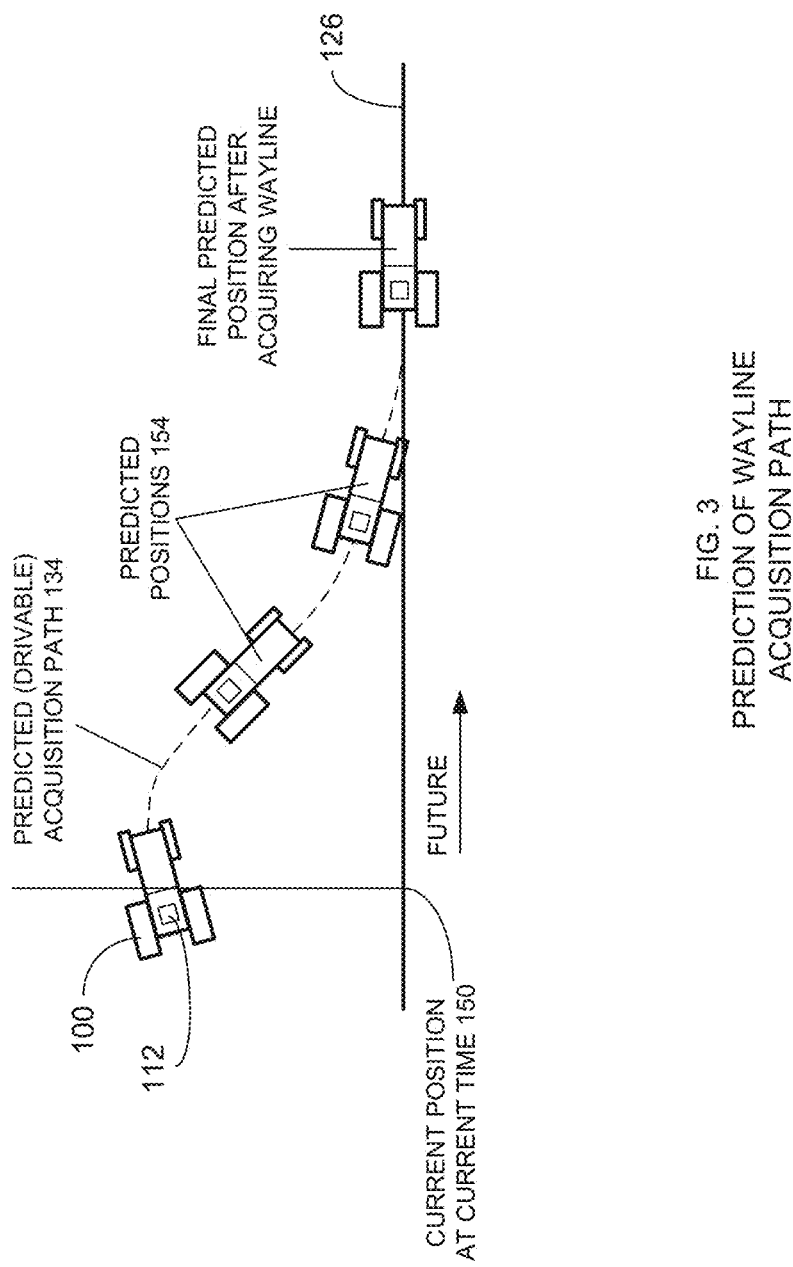
FIG. 3 shows an example predicted acquisition path.

FIG. 3 shows one example acquisition path 134 generated by line acquisition system 112. At a current time 150, line acquisition system 112 determines the current states and position errors of vehicle 100 relative to destination path 126. For example, line acquisition system 112 may determine the current position and heading of vehicle 100 from a GPS receiver and inertial sensors operating on vehicle 100.

Line acquisition system 112 then generates acquisition path 134 by calculating a demanded steering curvature for vehicle 100 to reduce a current cross-track and heading error. Line acquisition system 112 feeds the demanded steering curvature into the vehicle model to predict a next position 154 of vehicle 100 toward destination path 126. As mentioned above, line acquisition system 112 completes acquisition path 134 when the cross-track error and heading error for a current predicted position 154 is within some range of destination path 126.

Figure 4:
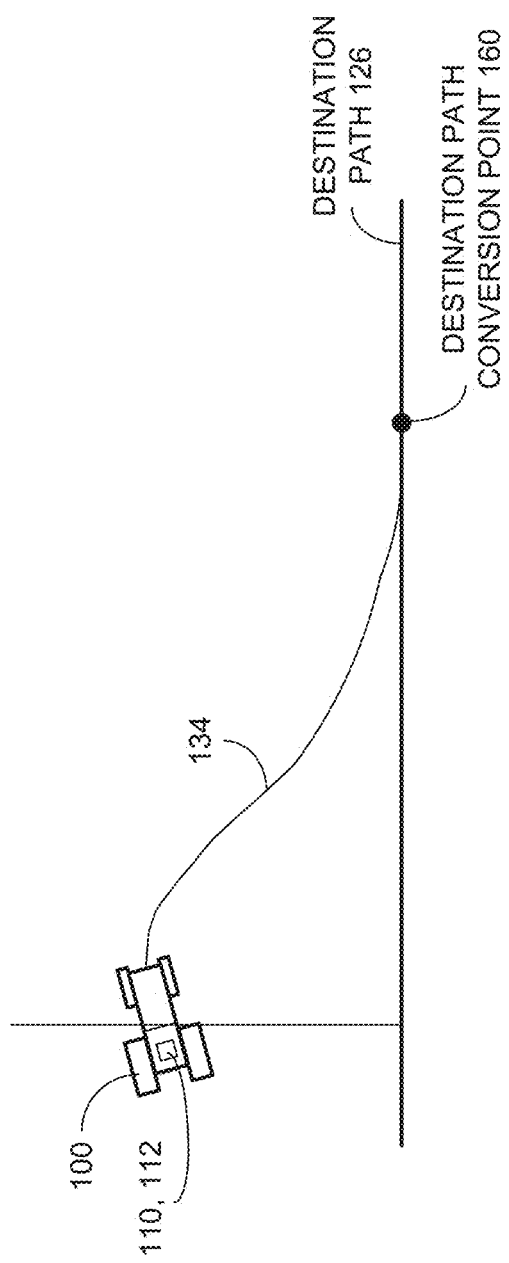
FIG. 4 shows a vehicle using the acquisition path to acquire a destination path.

FIG. 4 shows steering control system 110 automatically steering vehicle 100 along acquisition path 134. Referring to FIGS. 1 and 4, predicted acquisition path 134 is sent to vehicle path planner 122. Vehicle path planner 122 displays acquisition path 134 on user interface 125. The vehicle operator may engage steering controller 124 when acquisition path 134 converges with destination path 126 at an acceptable acquisition point 160 and does not intersect with any obstructions.

In response to the user selecting acquisition path 134, vehicle path planner 122 may combine acquisition path 134 with destination path 126. Vehicle path planner 122 then sends the combined paths 134 and 126 to steering controller 124. Steering controller 124 then uses navigation information, such as GPS and inertial sensor information, to steer vehicle 100 along acquisition path 134 and onto destination path 126.

Control systems that automatically steer agricultural vehicles using GPS/INS technology over destination paths are described in U.S. Pat. No. 7,142,956, issued Nov. 28, 2006, entitled: AUTOMATIC STEERING SYSTEM AND METHOD; U.S. Pat. No. 7,689,354, issued Mar. 30, 2010, entitled ADAPTIVE GUIDANCE SYSTEM AND METHOD; U.S. Pat. No. 7,835,832, Nov. 16, 2010, entitled: VEHICLE CONTROL SYSTEM; and U.S. Pat. No. 7,437,230, issued Oct. 14, 2008, entitled: SATELLITE BASED VEHICLE GUIDANCE CONTROL IN STRAIGHT AND CONTOUR MODES, which are all herein incorporated by reference in their entireties.

FIG. 5A shows how the line acquisition system automatically updates the acquisition path. A vehicle operator may manually steer vehicle 100 into different positions 162A-162C relative to destination path 126. Line acquisition system 112 may automatically update acquisition paths 134A-134C based on the current positions 162A-162C, respectively, of vehicle 100. For example, line acquisition system 112 calculates a first acquisition path 134A of vehicle 100 at a first position and heading 162A. As vehicle 100 moves from position 162A to position and heading 162B, line acquisition system 112 calculates a new acquisition path 134B. Line acquisition system 112 continuously recalculates and displays acquisition paths 134 for the new positions 162 of vehicle 100.

Acquisition paths 134A-134C provide the vehicle operator with a visual indication of any impediments that may prevent activation of the automatic steering controller. For example, a boulder 164 may lie in acquisition path 134A. The vehicle operator may delay activation of steering controller 124 (FIG. 1) until vehicle 100 moves into a different position 162B or 162C where boulder 164 no long lies in the associated acquisition path 134B or 134C, respectively.

Figure 5B:
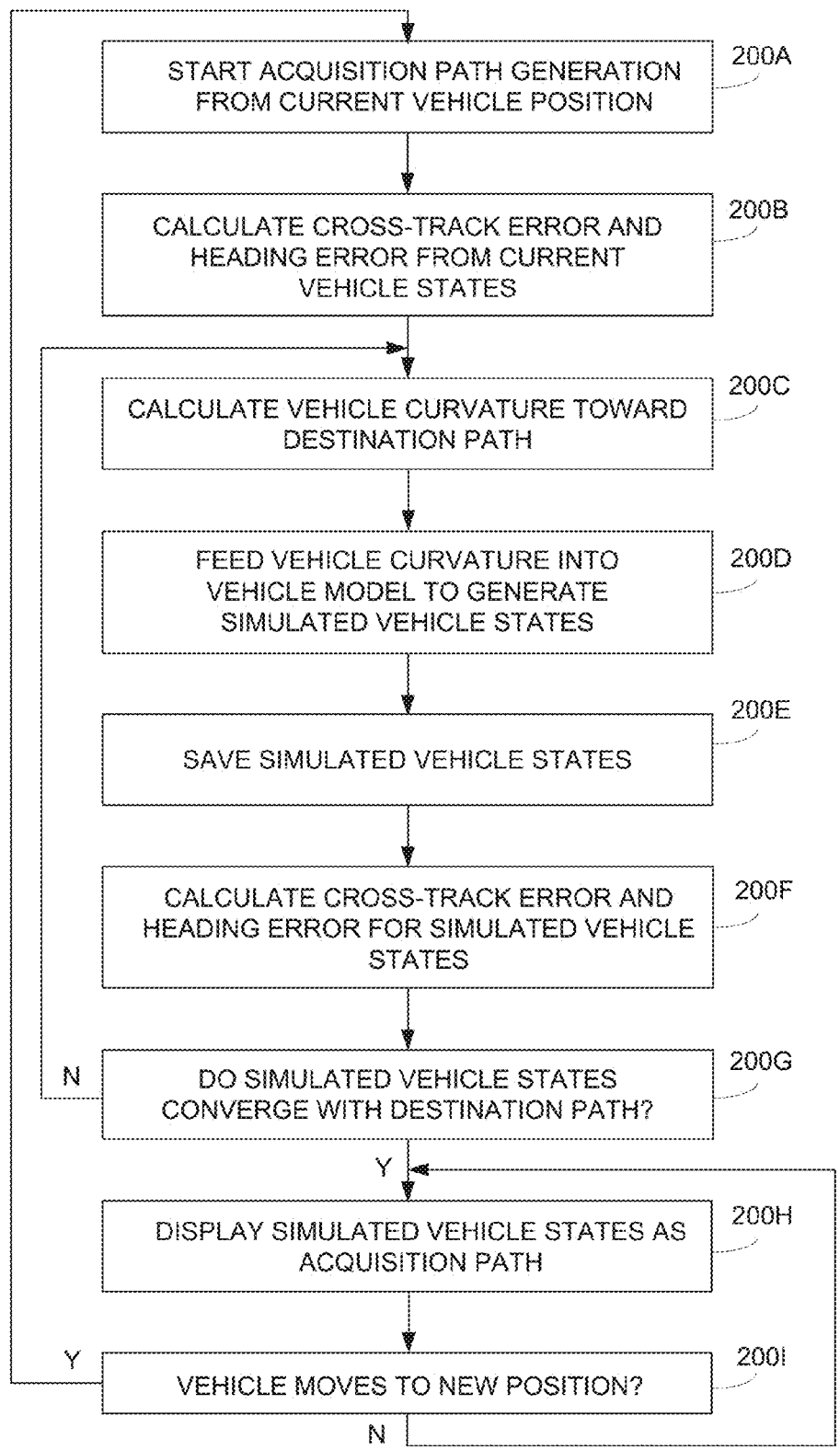
FIG. 5B shows a process for generating the acquisition paths.

FIG. 5B shows an example process for generating an acquisition path. In operation 200A, the line acquisition system starts acquisition path generation from a current vehicle position. For example, the user may be manually steering the vehicle into different positions relative to a destination path.

In operation 200B, the line acquisition system calculates a cross-track error and heading error between the current vehicle position and the destination path. In operation 200C, the line acquisition system calculates a vehicle curvature to reduce the calculated cross-track and heading errors. For example, the line acquisition system may calculate a demanded vehicle curvature that turns the vehicle as hard as possible to the right or left to acquire the destination path as quickly as possible.

In operation 200D, the line acquisition system feeds the demanded vehicle curvature into the vehicle model to generate next simulated vehicle states. For example, the vehicle model simulates a next vehicle position and heading based on the demanded vehicle curvature and the curvature limitations of the vehicle. In operation 200E, the line acquisition system stores the simulated vehicle states in memory.

In operation 200F, the line acquisition system calculates a next cross-track error and heading error for the next simulated vehicle states. In operation 200G, the line acquisition system determines if the simulated vehicle states converge with the destination path. For example, the line acquisition system determines if the cross-track error and heading error are within predefined threshold values. If not, the line acquisition system jumps back to operation 200C and calculates a next demanded vehicle curvature for generating next simulated vehicle states toward the destination path.

If the simulated vehicle states converge with the destination path in operation 200G, the line acquisition system in operation 200H displays the set of simulated vehicle states as the acquisition path. In operation 200I, the vehicle may move to a new location. For example, the user may continue to manually steer the vehicle. The line acquisition system jumps to operation 200A and calculates a new acquisition path for the new vehicle position.

Line Acquisition Examples

FIGS. 6-11 illustrate additional examples of how the line acquisition system generates different acquisition paths. In these examples, vehicle 100 is at various positions relative to destination path 126. The associated acquisition paths 134 are displayed on user interface 125, showing the user the path vehicle 100 would drive from a current position to reach destination path 126. The direction and shapes of acquisition paths 134 may change based on destination path shape, vehicle position relative to the destination path, vehicle speed and vehicle steering limits, such as maximum curvature and maximum curvature rate.

FIGS. 6A-6D show different acquisitions paths 134A-134D, respectively, that acquire a straight line destination path 126. FIG. 6A shows an example of a direct approach where vehicle 100 has an initial zero vehicle curvature. FIG. 6B shows an example of a direct approach where vehicle 100 has an initial non-zero vehicle curvature. FIG. 6C shows an example indirect approach towards destination path 126 where vehicle 100 has an initial non-zero vehicle curvature. FIG. 6D shows an example indirect approach of vehicle 100 initially turned away from destination path 126 with an initial non-zero vehicle curvature.

In the examples in FIGS. 6A-6D, the initial conditions of vehicle 100 vary in position, heading and curvature relative to destination path 126. In each example, line acquisition system 112 generates drivable acquisition paths 134 that smoothly acquire destination path 126 in the current direction of travel of vehicle 100. As mentioned above, the control module 116 in FIG. 1 incrementally derives new vehicle curvatures 132 to reduce a current cross-track and heading error and move vehicle 100 closer to destination path 126.

Figure 8B:
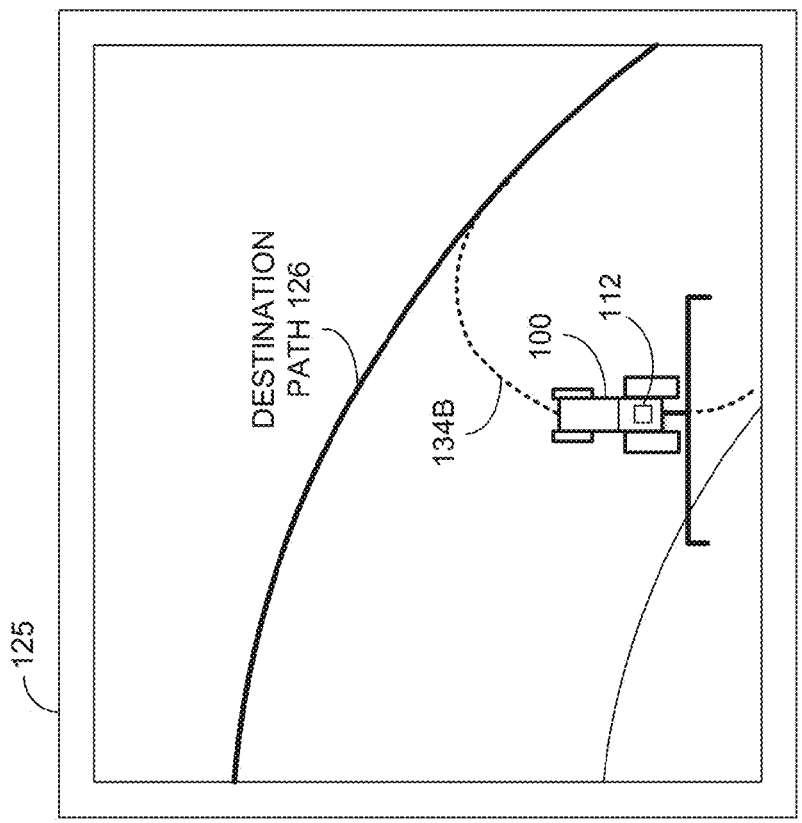
FIGS. 8A and 8B show examples of left and right turn acquisition paths onto a curved destination path.
Figure 8A:
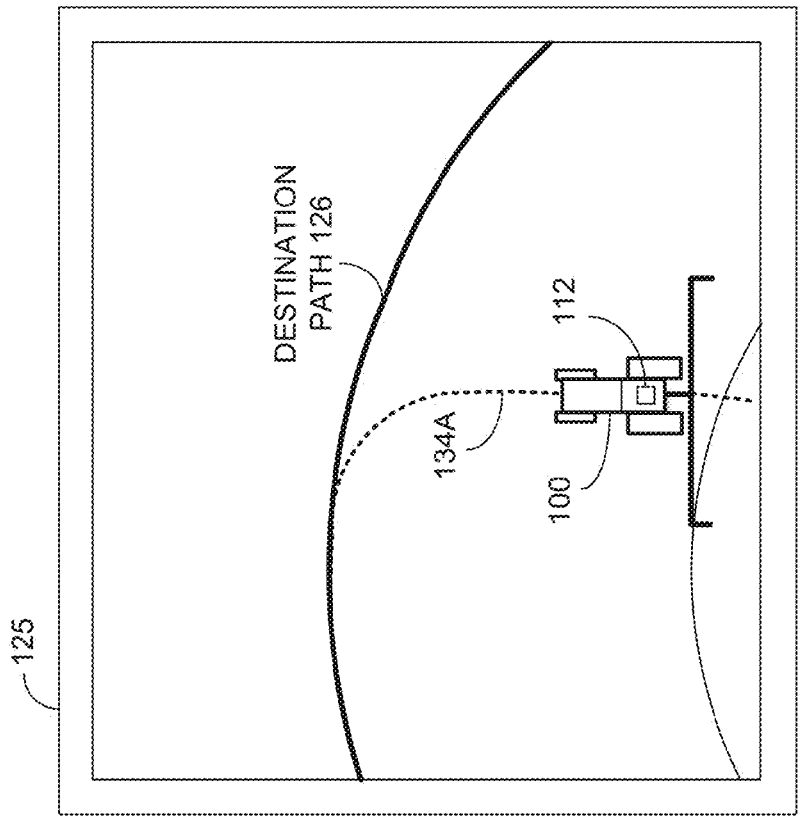

FIGS. 7A and 7B show examples where acquisitions paths 134A and 134B, respectively, turn in opposite directions onto destination path 126. Acquisition paths 134A and 134B are analogous to vehicle 100 attempting a headland or end-of-row turn when transitioning from one destination path 126 to another destination path 126. Line acquisition system 112 may generate acquisition paths 134 in any direction and is not restricted by limitations of steering controller 124 in FIG. 1. FIGS. 8A and 8B show example acquisition paths 134A and 134B, respectively, generated onto circular destination paths 126. FIGS. 9A-9D show example acquisition paths, 134A-134D, respectively, generated onto contoured destination paths 126 with changing curvatures. In these examples, line acquisition system 112 generates smooth acquisition path transitions onto circular and contoured destination paths 126.

Line acquisition system 112 may identify a point on destination path 126 closest to a current predicted position of vehicle 100. The identified position on destination path 126 may have a different curvature than a previous closest position on destination path 126. Line acquisition system 112 calculates a new cross-track error and direction error between the predicted position of vehicle 100 and the new identified point on destination path 126. Line acquisition system 112 uses the calculated cross-track error, heading error, vehicle curvature, and vehicle curvature rate to predict a next position and heading for vehicle 100. Thus, as the predicted positions of vehicle 100 move closer to destination path 126, line acquisition system 112 continues to generate simulated vehicle states that align with destination path 126.

For example, in FIG. 7A, line acquisition system 112 may generate a right-hand turn for acquisition path 134A since the right-hand turn may provide the shortest path to destination path 126. In FIG. 7B, line acquisition system 112 may generate a left-hand turn for acquisition path 134B since vehicle 100 is already in a right-hand curvature and the left-hand acquisition path 134B may provide the shortest path onto destination path 126.

Based on the position and orientation of vehicle 100 in FIG. 8A, line acquisition system 112 may determine a left-hand turn creates a shorter acquisition path 134A to destination path 126. Based on the position and right-hand curvature of vehicle 100 in FIG. 8B, line acquisition system 112 may determine a right-hand turn creates a shorter acquisition path 134B to destination path 126.

Figure 9A:
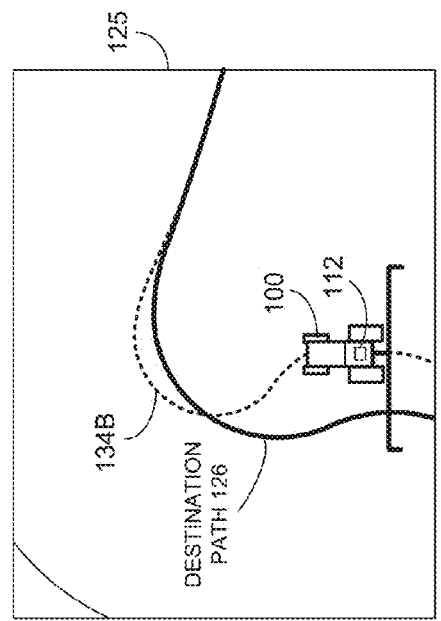
FIGS. 9A-9D show examples of acquisition paths for acquiring contoured destination paths.
Figure 9B:
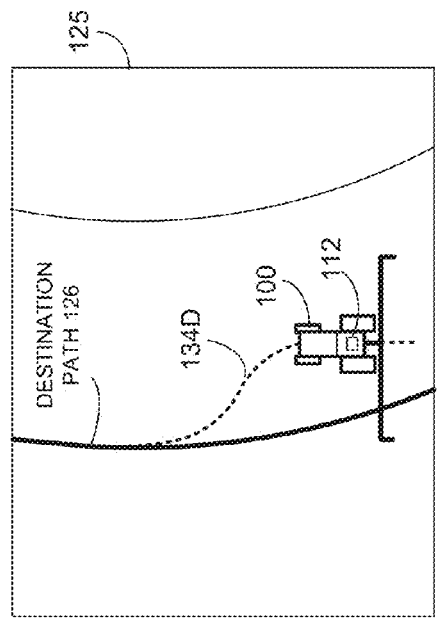

FIGS. 9A and 9B show how line acquisition system 112 may generate acquisition paths 134A and 134B, respectively, with multiple turns. For example, vehicle 100 in FIG. 9A may be located just in front of, or on, destination path 126. Line acquisition system 112 may generate a first right-turn to re-approach destination path 126 and then generate a second left-hand turn in acquisition path 134A to converge and align with destination path 126. Line acquisition system 112 in FIG. 9B may generate a first left-hand turn in acquisition path 134B to initially approach destination path 126 and then determine a second right-hand turn is needed to converge and align with destination path 126.

Figure 9C:
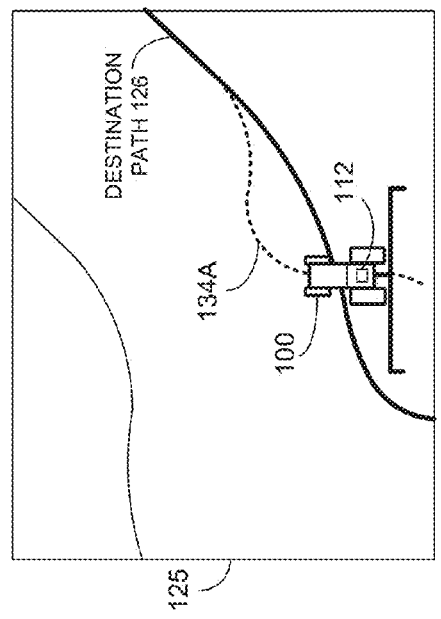
Figure 9D:
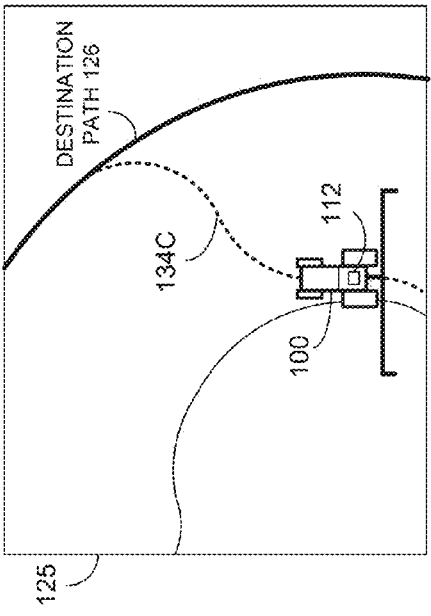

Similarly, FIGS. 9C and 9D show how the line acquisition system 112 may generate an initial right or left turn in acquisition paths 134C and 134D, respectively, to reduce the cross-track error and move vehicle 100 closer to destination path 126. Line acquisition system 112 then generates opposite left or right turns in acquisition paths 134C and 134D, respectively, to reduce cross-track and directional error and align vehicle 100 onto contoured destination paths 126.

Figure 10B:
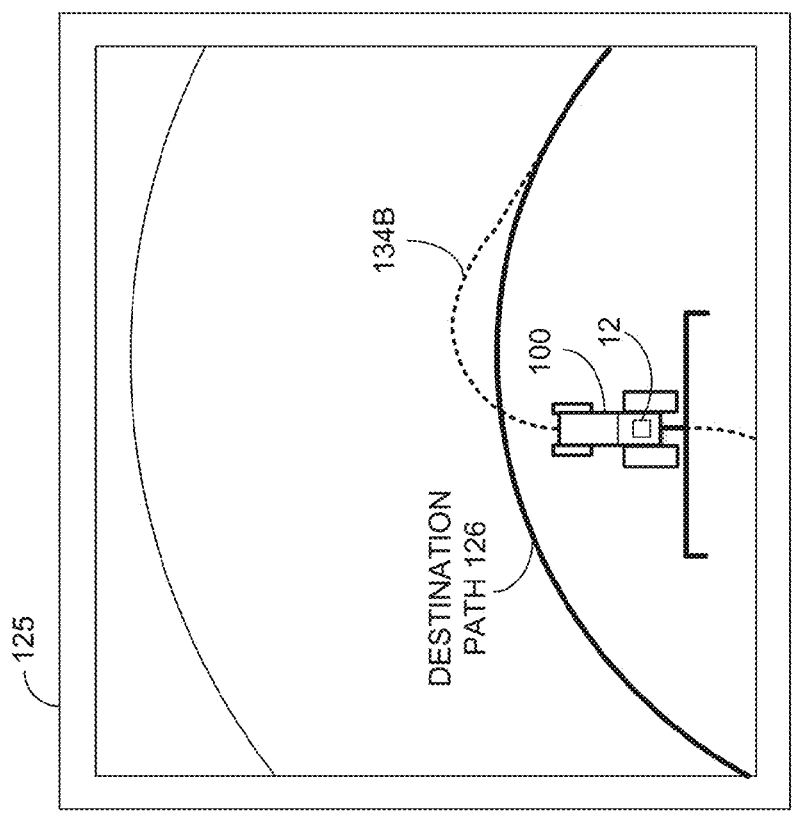
FIGS. 10A and 10B show examples of acquisition paths generated when a steering controller may not normally engage with the destination path.
Figure 10A:
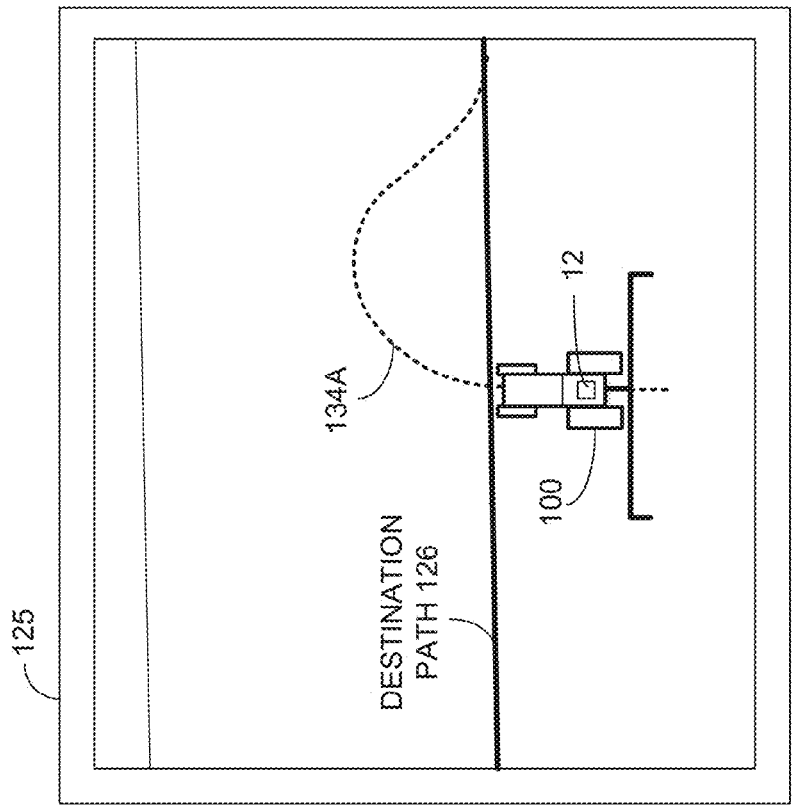

FIGS. 10A and 10B show how line acquisition system 112 generates acquisition paths during steering controller non-engagement conditions. The initial positions of vehicle 100 relative to destination path 126 in FIG. 10A (straight destination path) and FIG. 10B (circular destination path) may prevent steering controller 124 in FIG. 1 from engaging and automatically steering vehicle 100.

For example, a user may try to activate steering controller 124 to start automatically steering vehicle 100 onto destination path 126. Steering controller 124 may not activate when vehicle 100 is too close to destination path 126 as shown in FIG. 10A or when vehicle 100 approaches destination path 126 at too wide of an angle as shown in FIG. 10B. For example, some steering controllers may not engage if the heading error between vehicle 100 and destination path 126 is greater than 80 degrees.

Line acquisition system 112 provides acquisition paths 134A and 134B in FIGS. 10A and 10B, respectively, to expand steering controller engagement conditions. With acquisition paths 134A and 134B, steering controller 124 is no longer limited to engaging based on a current vehicle position relative to destination path 126. Since vehicle 100 is already located and aligned with simulated acquisition paths 134A and 134B, any cross-track or heading errors between vehicle 100 and acquisition path 134 should already be within allowable engagement thresholds for steering controller 124.

Line acquisition system 112 also allows a user to control where vehicle 100 intercepts destination path 126. Referring again to FIG. 7A, the user may manually steer vehicle 100 more toward the right to cause line acquisition system 112 to create an acquisition path 134A that turns towards the right and acquires destination path 126 to the right of vehicle 100. Referring again to FIG. 7B, the user may steer vehicle 100 more toward the left to cause line acquisition system 112 to create acquisition path 134B that turns to the left and acquires destination path 126 to the left of vehicle 100.

Figure 11B:
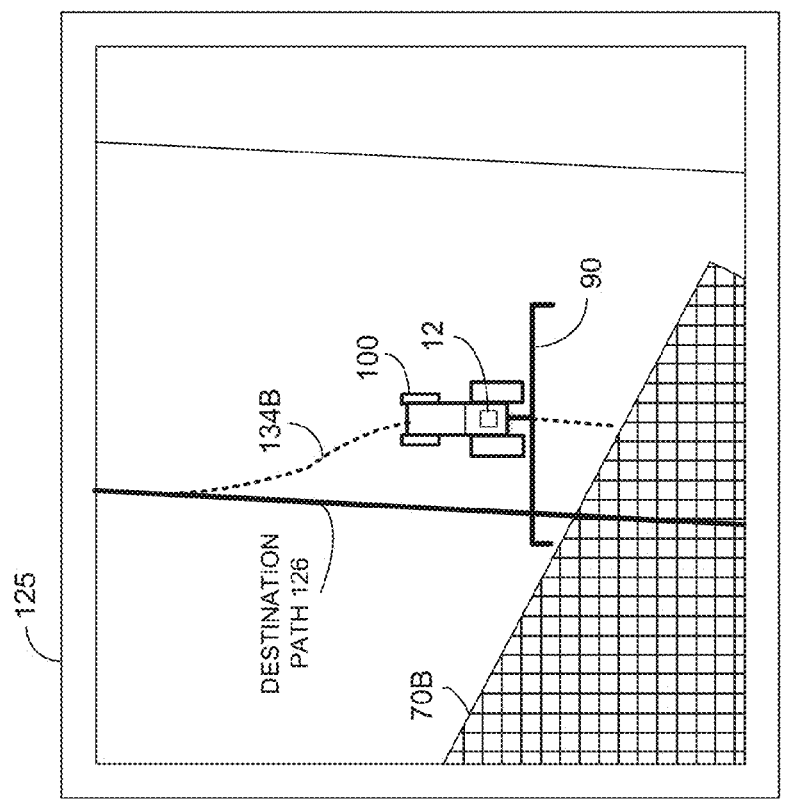
FIGS. 11A and 11B show how acquisition paths prevent automatic steering engagement over a worked area.
Figure 11A:
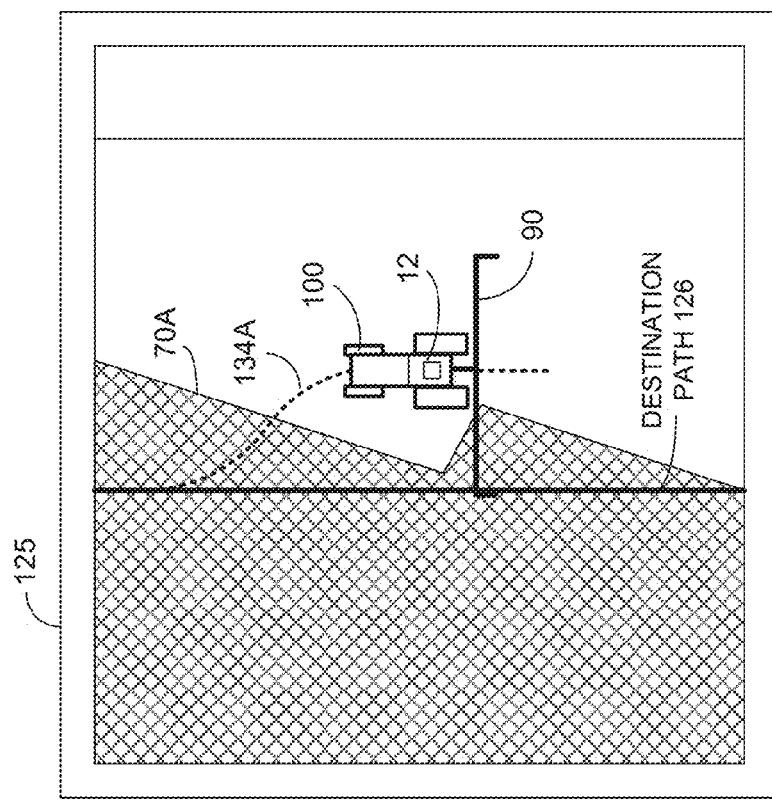

FIGS. 11A and 11B show how line acquisition system 112 is used in conjunction with automatic steering to avoid certain areas. FIG. 11A shows an acquisition path 134A that crosses an existing swath area 70A and FIG. 11B shows an acquisition path 134B that clears an existing swath area 70B. In this example, areas 70A and 70B may have previously worked by plowing, or applying seed, fertilizer, weed killer, or the like, or any combination thereof. The vehicle operator may not want to avoid crossing or reworking areas 70A and 70B.

In FIG. 11A, the vehicle operator may choose not to engage automatic steering controller 124 and perform a different action. For example, the vehicle operator may manually drive vehicle 100 around area 70A or drive vehicle 100 over area 70A but not activate an implement 90 that may apply fertilizer or plant seeds.

In FIG. 11B, the vehicle operator is free to engage steering controller 124 and automatically steer vehicle 100 along acquisition path 134B and onto destination path 126 with no risk of crossing previously worked area 70B. As mentioned above in FIG. 5A, displaying acquisition path 134 on user interface 125 also allows the vehicle operator to identify acquisition paths 134 that intersect obstacles, such as boulders, trees, ditches, etc. The user may manually steer vehicle 100 to a different location with a different acquisition path 134 to avoid the obstacle prior to engaging automatic steering controller 124.

Line acquisition system 112 effectively eliminates the line acquisition phase where steering controller 124 acquires the destination path (way-line). Steering controller 124 may no longer need to calculate the large cross-track and heading errors during the line acquisition phase and now may operate in a single tracking mode where vehicle 100 follows already acquired acquisition path 134 and destination path 126.

Computer, Software, and Hardware Systems

A Global navigation satellite system (GNSS) may include GPS (U.S.) Galileo (European Union, proposed) GLONASS (Russia), Beidou (China) Compass (China, proposed) IRNSS (India, proposed), QZSS (Japan, proposed) and other current and future positioning technology using signal from satellites, with or with augmentation from terrestrial sources.

Inertial navigation systems (INS) may include gyroscopic (gyro) sensors, accelerometers and similar technologies for providing outputs corresponding to the inertial of moving components in all axes, i.e., through six degrees of freedom (positive and negative directions along transverse X, longitudinal Y and vertical Z axes). Yaw, pitch and roll refer to moving component rotation about the Z, X, and Y axes respectively. Terminology may include the words specifically mentioned, derivative thereof and words of similar meaning.

Figure 12:
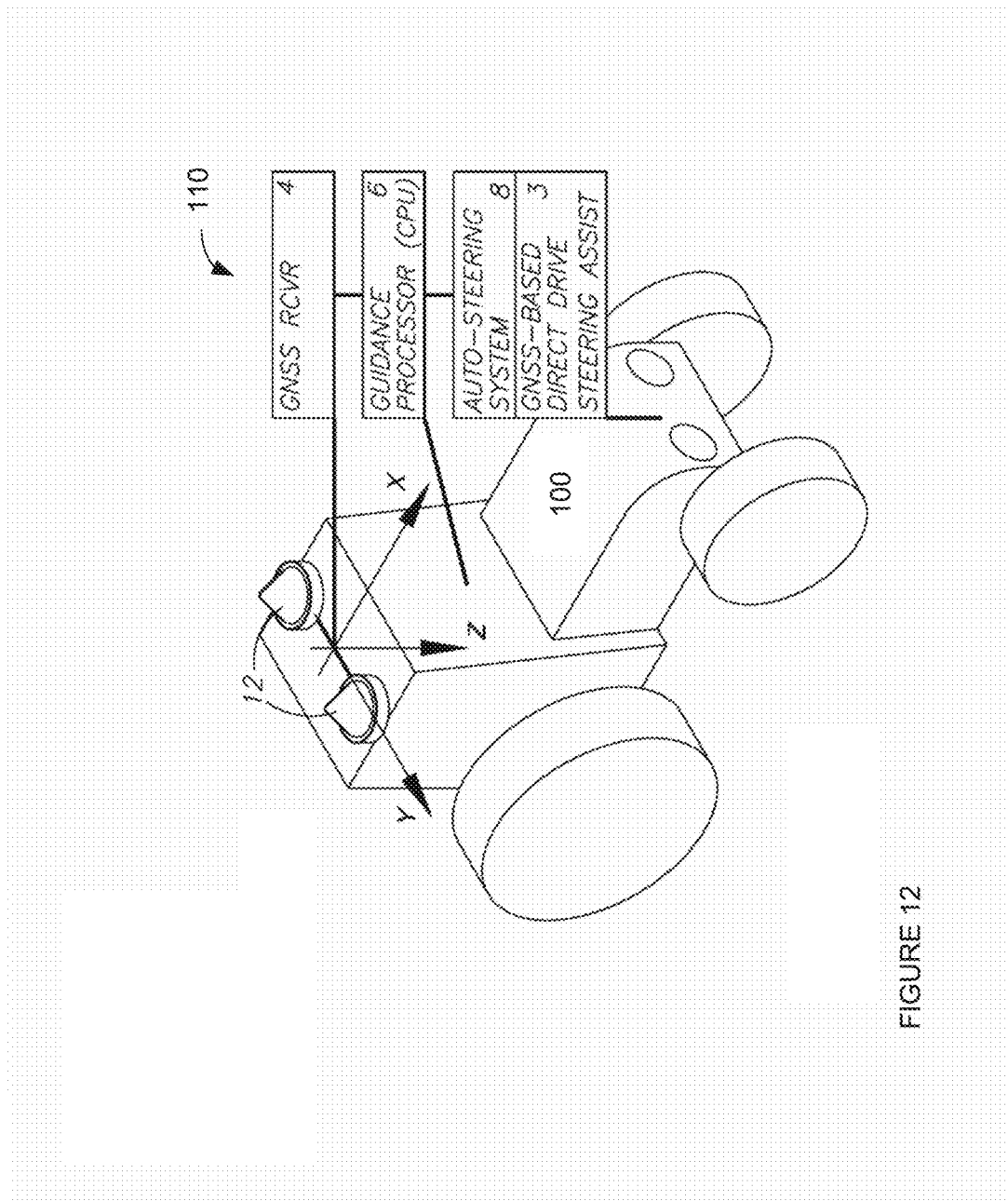
FIG. 12 shows an example guidance system that includes the line acquisition system.

FIG. 12 generally shows control system 110 used in conjunction with an electrical direct-drive steering assistance mechanism 3. Without limitation on the generality of useful applications of control system 110 may include a GNSS receiver 4, and a guidance processor 6 connected to a GNSS antenna 12 and installed into vehicle 100, such as an agricultural vehicle or tractor. An auto-steering system 8 is electrically connected to guidance processor 6, and is mechanically interfaced with vehicle 100 via steering assistance mechanism 3.

Figure 13:
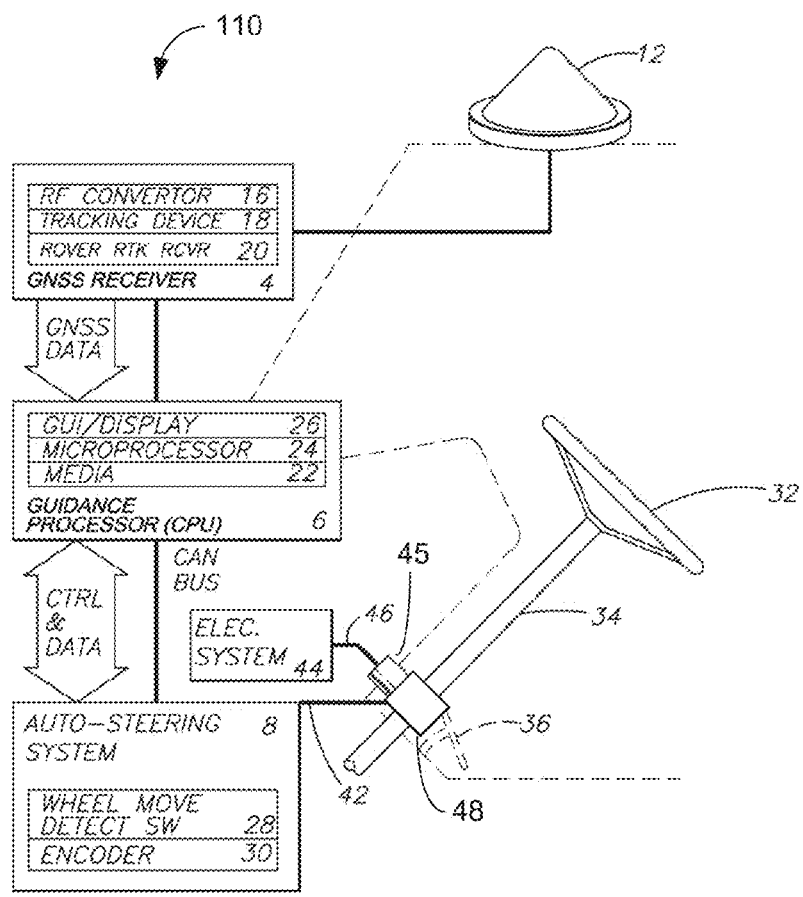
FIG. 13 shows the guidance system of FIG. 12 controlling an auto-steering system.

FIG. 13 shows additional detail of control system 110. GNSS receiver 4 is further comprised of an RF convertor (i.e., downconvertor) 16, a tracking device 18, and a rover RTK receiver element 20. The receiver 4 electrically communicates with, and provides GNSS positioning data to, guidance processor 6. Guidance processor 6 includes a graphical user interface (GUI) 26, a microprocessor 24, and a media element 22, such as a memory storage drive. Guidance processor 6 electrically communicates with, and provides control data to auto-steering system 8. Auto-steering system 8 includes a wheel movement detection switch 28 and an encoder 30 for interpreting guidance and steering commands from CPU 6.

Auto-steering system 8 may interface mechanically with the vehicle's steering column 34, which is mechanically attached to steering wheel 32. A control line 42 may transmit guidance data from the CPU 6 to auto-steering system 8. An electrical subsystem 44, which powers the electrical needs of vehicle 100, may interface directly with auto-steering system 8 through a power cable 46. Auto-steering subsystem 8 can be mounted to steering column 34 near the floor of the vehicle, and in proximity to the vehicle's control pedals 36. Alternatively, auto-steering system 8 can be mounted at other locations along steering column 34.

Auto-steering system 8 physically drives and steers vehicle 100 by actively turning the steering wheel 32 via steering column 34. A motor 45 powered by vehicle electrical subsystem 44 may power a worm drive which powers a worm gear 48 affixed to auto-steering system 8. These components are preferably enclosed in an enclosure. In other embodiments, auto-steering system 8 is integrated directly into the vehicle drive control system independently of steering column 34.

Some of the operations described above may be implemented in software and other operations may be implemented in hardware. One or more of the operations, processes, or methods described herein may be performed by an apparatus, device, or system similar to those as described herein and with reference to the illustrated figures. The computing devices described above may include any collection of devices or circuitry that individually or jointly execute a set (or multiple sets) of instructions to perform any one or more of the operations discussed above. Computing devices may be part of an integrated control system or system manager, or may be provided as a portable electronic device configured to interface with a networked system either locally or remotely via wireless transmission.

"Computer-readable storage medium" (or alternatively, "machine-readable storage medium") used in control system 110 may include any type of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Examples of systems, apparatus, computer-readable storage media, and methods are provided solely to add context and aid in the understanding of the disclosed implementations. It will thus be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations. Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

What is claimed is:

1. A line acquisition system for automatically steering a vehicle, comprising:
 a hardware processor to:
 identify a destination path;
 receive sensor data from a global positioning system (GPS);
 calculate a current position of the vehicle based on the GPS sensor data;
 calculate a simulated acquisition path from the current position of the vehicle to the destination path;
 store the simulated acquisition path in memory;
 repeatedly recalculate the acquisition path for a current position of the vehicle relative to the destination path;

display the acquisition path on a user interface; and
send the acquisition path to an automatic steering controller based on a selection of the displayed acquisition path.

2. The line acquisition system of claim 1, the processor further to:
incrementally calculate new simulated states of the vehicle toward the destination path based on error states between previous simulated states of the vehicle and the destination path; and
store the new simulated states and previous simulated states of the vehicle as the simulated acquisition path.

3. The line acquisition system of claim 1, the processor further to:
identify a curvature and curvature rate for the vehicle; and
calculate the simulated acquisition path based on the curvature and curvature rate.

4. The line acquisition system of claim 1, the processor further to:
continuously calculate new simulated acquisition paths for new positions of the vehicle; and
display the new simulated acquisition paths on the user interface.

5. The line acquisition system of claim 1, the hardware processor further to:
display an area on the user interface;
display a section of the area previously worked by the vehicle; and
display the destination path and the acquisition path with the area and the section of the area previously worked by the vehicle.

6. The line acquisition system of claim 1, the processor further to:
send steering commands to the automatic steering controller to steer the vehicle along the acquisition path until reaching the destination path and then send steering commands to the automatic steering controller to steer the vehicle along the destination path.

7. A line acquisition system for automatically steering a vehicle, comprising:
a hardware processor configured to:
identify a destination path;
receive sensor data from a global positioning system (GPS);
calculate a current location and current heading of the vehicle from the GPS sensor data;
calculate a heading error between the current heading of the vehicle and a heading of the destination path;
calculate a cross-track error between the current location of the vehicle and the destination path;
predict incremental positions of the vehicle based on the heading error, cross-track error, a curvature of the vehicle and a curvature rate of the vehicle; and
use the incremental positions of the vehicle as a simulated acquisition path from the vehicle to the destination path;
store the simulated acquisition path in memory;
repeatedly recalculate the acquisition path for a current position of the vehicle relative to the destination path;
display the acquisition path on a user interface; and
send the acquisition path to an automatic steering controller based on a selection of the displayed acquisition path.

8. A line acquisition system for automatically steering a vehicle, comprising:
a hardware processor to:
identify a destination path;
receive sensor data from a global positioning system (GPS);
calculate a current location and current heading of the vehicle from the GPS sensor data;
calculate a simulated acquisition path from the current position and heading of the vehicle to the destination path;
store the simulated acquisition path in memory;
repeatedly recalculate the acquisition path for a current position of the vehicle relative to the destination path;
display the acquisition path on a user interface; and
send the acquisition path to an automatic steering controller based on a selection of the displayed acquisition path, wherein the processor is further to calculate the simulated acquisition path based on a vehicle model expressed as:

$$\dot{x} = V\cos(\psi)$$

$$\dot{y} = V\sin(\psi)$$

$$\dot{\psi} = V\kappa_d$$

where:
x and y are positional coordinates of the vehicle;
$\psi$ is a heading of the vehicle;
V is a speed of the vehicle;
$\kappa_d$ is a curvature demand for the vehicle, where $$\kappa_d = K_1 e_\psi + K_2 e_{ct} + K_3 \int e_{ct} dt;$$

$K_1$ is a controller gain acting on a heading error $e_\psi$;
$K_2$ is a controller gain acting on a cross-track error $e_{ct}$; and
$K_3$ is a controller gain acting on a cross-track error integral $\int e_{ct} dt$.

9. A computer program for controlling a vehicle, the computer program comprising a set of instructions operable to:
identify a destination path;
predict incremental positions of the vehicle from different locations of the vehicle to the destination path;
calculate a heading error between a heading of the vehicle and a heading of the destination path for a current one of the predicted incremental positions of the vehicle;
calculate a cross-track error between a current location of the vehicle and the destination path for a current one of the predicted incremental positions of the vehicle;
predict a next one of the incremental positions of the vehicle based on the heading error and cross-track error;
use the incremental positions of the vehicle as acquisition paths from different locations of the vehicle to the destination path;
display the different acquisition paths for the different locations of the vehicle on a user interface;
detect a request to automatically steer the vehicle; and
use one of the acquisition paths for a current location of the vehicle to automatically steer the vehicle to the destination path.

10. The computer program of claim 9, wherein the instructions are further operable to:
identify a curvature and curvature rate for the vehicle;
identify a distance and heading of the vehicle relative to the destination path; and
predict the incremental positions of the vehicle based on the curvature, curvature rate, distance, and heading of the vehicle.

11. The computer program of claim 9, wherein the instructions are further operable to:

receive selection of one of the acquisition paths displayed on the user interface; and generate steering commands to automatically steer the vehicle along the selected one of the acquisition paths until reaching the destination path and then automatically steer the vehicle along the destination path.

12. The computer program of claim 9, wherein the instructions are further operable to display an area on the user interface;

display a section of the area previously worked by the vehicle; and display the destination path and the acquisition path with the area and the section of the area previously worked by the vehicle.

13. A computer program for controlling a vehicle, the computer program comprising a set of instructions operable to:

identify a destination path;

predict different acquisition paths from different locations of the vehicle to the destination path;

display the different acquisition paths for the different locations of the vehicle on a user interface;

detect a request to automatically steer the vehicle; and use one of the acquisition paths for a current location of the vehicle to automatically steer the vehicle to the destination path, wherein the instructions are further operable to predict the acquisition paths based on a vehicle model expressed as:

$$\dot{x} = V\cos(\psi)$$

$$\dot{y} = V\sin(\psi)$$

$$\dot{\psi} = V\kappa_d$$

where x and y are positional coordinates of the vehicle;

$\psi$ is a heading of the vehicle;

V is a speed of the vehicle;

$\kappa_d$ is a curvature demand for the vehicle, where $$\kappa_d = K_1 e_\psi + K_2 e_{ct} + K_3 \int e_{ct} dt;$$

$K_1$ is a controller gain acting on a heading error $e_\psi$;

$K_2$ is a controller gain acting on a cross-track error $e_{ct}$; and $K_3$ is a controller gain acting on a cross-track error integral $\int e_{ct} dt$.

14. A computer program stored on a non-transitory storage medium, the computer program comprising a set of instructions, when executed by a hardware processor, cause the hardware processor to:

generate error states for simulated states of a vehicle from a destination path;

generate desired vehicle curvatures based on the error states;

generate the simulated states of the vehicle based on the desired vehicle curvatures;

use the simulated vehicle states to generate acquisition paths from different locations of the vehicle to the destination path; and display the acquisition paths on a user interface to enable a vehicle driver to view how an automatic steering controller would steer the vehicle onto the destination path.

15. The computer program of claim 14, wherein the set of instructions, when executed by a hardware processor, further cause the hardware processor to calculate cross-track error states and heading error states between the simulated states of the vehicle and the destination path.

16. The computer program of claim 14, wherein the set of instructions, when executed by a hardware processor, further cause the hardware processor to generate the simulated states of the vehicle based on the desired vehicle curvatures and a measured curvature and curvature rate of the vehicle.

17. The computer program of claim 14, wherein the set of instructions, when executed by a hardware processor, further cause the hardware processor to:

detect a request to activate an automatic steering controller; and generate steering commands that cause the automatic steering controller to steer the vehicle along one of the acquisition paths for a current location of the vehicle onto the destination path.

* * * * *